(12) United States Patent
Tanaka et al.

(10) Patent No.: US 12,123,715 B2
(45) Date of Patent: Oct. 22, 2024

(54) MAGNET HOLDER

(71) Applicant: DENSO CORPORATION, Kariya (JP)

(72) Inventors: Asuka Tanaka, Kariya (JP); Toshihiro Fujita, Kariya (JP); Jun Morimoto, Kariya (JP)

(73) Assignee: DENSO CORPORATION, Kariya (JP)

( * ) Notice: Subject to any disclaimer, the term of this patent is extended or adjusted under 35 U.S.C. 154(b) by 74 days.

(21) Appl. No.: 17/813,522

(22) Filed: Jul. 19, 2022

(65) Prior Publication Data
US 2022/0349697 A1 Nov. 3, 2022

Related U.S. Application Data

(63) Continuation of application No. PCT/JP2021/001592, filed on Jan. 19, 2021.

(30) Foreign Application Priority Data

Jan. 23, 2020 (JP) .................................. 2020-008867

(51) Int. Cl.
| | | |
|---|---|---|
| *G01B 7/30* | (2006.01) | |
| *F16M 13/02* | (2006.01) | |
| *H01F 7/02* | (2006.01) | |

(52) U.S. Cl.
CPC ............... *G01B 7/30* (2013.01); *F16M 13/02* (2013.01); *H01F 7/02* (2013.01)

(58) Field of Classification Search
CPC .. G01B 7/30; F16M 13/02; H01F 7/02; H01F 7/0221
See application file for complete search history.

(56) References Cited

U.S. PATENT DOCUMENTS

| | | | | |
|---|---|---|---|---|
| 2014/0070799 | A1* | 3/2014 | Taniguchi | G01B 7/30 324/207.25 |
| 2014/0312746 | A1* | 10/2014 | Taniguchi | H02K 29/06 310/68 B |
| 2019/0265070 | A1* | 8/2019 | Hori | G01D 11/24 |
| 2019/0280568 | A1* | 9/2019 | Mori | B62D 5/0481 |

(Continued)

FOREIGN PATENT DOCUMENTS

| | | | |
|---|---|---|---|
| JP | 2011160636 A | * | 8/2011 |
| JP | 2016-031342 A | | 3/2016 |

(Continued)

*Primary Examiner* — Terrell L McKinnon
*Assistant Examiner* — Ding Y Tan
(74) *Attorney, Agent, or Firm* — MASCHOFF BRENNAN (57) ABSTRACT

A magnet holder is used in a rotational angle sensing device and is shaped in a tubular form while the magnet holder is configured to hold a magnet opposed to a magnetic sensor and is also configured to be securely press-fitted to a rotatable body. The magnet holder includes: a magnet holding portion that is located at one side of the magnet holder in an axial direction; a press-fitting fixation portion that is located at another side of the magnet holder in the axial direction; and a connecting portion that connects between the magnet holding portion and the press-fitting fixation portion. An outer diameter of the press-fitting fixation portion is different from an outer diameter of the magnet holding portion, and a wall thickness of the press-fitting fixation portion is different from a wall thickness of the magnet holding portion.

9 Claims, 7 Drawing Sheets

(56) References Cited

U.S. PATENT DOCUMENTS

2020/0153314 A1\* 5/2020 Iwasaki .................. H02K 7/003
2022/0099118 A1\* 3/2022 Suzuki ...................... B22F 3/24

FOREIGN PATENT DOCUMENTS

| JP | 2020-165851 A | 10/2020 | |
| WO | WO-2017162379 A1 \* | 9/2017 | ......... H02K 15/0062 |
| WO | WO-2019082577 A1 \* | 5/2019 | |
| WO | 2020/170859 A1 | 8/2020 | |

\* cited by examiner

MAGNET HOLDER

CROSS REFERENCE TO RELATED APPLICATIONS

This application is a continuation application of International Patent Application No. PCT/JP2021/001592 filed on Jan. 19, 2021, which designated the U.S. and claims the benefit of priority from Japanese Patent Application No. 2020-008867 filed on Jan. 23, 2020. The entire disclosures of all of the above applications are incorporated herein by reference.

TECHNICAL FIELD

The present disclosure relates to a magnet holder.

BACKGROUND

Previously, there has been proposed a magnet holder for fixing a magnet to a rotatable body in a rotational angle sensing device while the rotational angle sensing device includes the magnet and a magnetic sensor. One such magnet holder is shaped in a tubular form and has a constant wall thickness. Another such magnet holder is made of a tubular member that has a relatively large wall thickness and has a recess formed by enlarging an inner diameter of one end portion of the tubular member while a magnet is installed in this recess. Each of these magnet holders is securely press-fitted to a shaft serving as the rotatable body.

SUMMARY

This section provides a general summary of the disclosure, and is not a comprehensive disclosure of its full scope or all of its features.

According to the present disclosure, there is provided a magnet holder that is used in a rotational angle sensing device and is shaped in a tubular form while the magnet holder is configured to hold a magnet opposed to a magnetic sensor and is also configured to be securely press-fitted to a rotatable body. The magnet holder includes: a magnet holding portion that is located at one side of the magnet holder in an axial direction; a press-fitting fixation portion that is located at another side of the magnet holder in the axial direction; and a connecting portion that connects between the magnet holding portion and the press-fitting fixation portion. An outer diameter of the press-fitting fixation portion is different from an outer diameter of the magnet holding portion, and a wall thickness of the press-fitting fixation portion is different from a wall thickness of the magnet holding portion.

BRIEF DESCRIPTION OF DRAWINGS

The drawings described herein are for illustrative purposes only of selected embodiments and not all possible implementations, and are not intended to limit the scope of the present disclosure.

DETAILED DESCRIPTION

Previously, there has been proposed a magnet holder for fixing a magnet to a rotatable body in a rotational angle sensing device while the rotational angle sensing device includes the magnet and a magnetic sensor. One such magnet holder is shaped in a tubular form and has a constant wall thickness. Another such magnet holder is made of a tubular member that has a relatively large wall thickness and has a recess formed by enlarging an inner diameter of one end portion of the tubular member while a magnet is installed in this recess. Each of these magnet holders is securely press-fitted to a shaft serving as the rotatable body.

Since the one such magnet holder is the tubular member having the constant wall thickness, adjustment of a press-fitting load at the time of assembling the magnet holder to the shaft is difficult. In the another such magnet holder, although the wall thickness of a press-fitting fixation portion is relatively large, the wall thickness of the press-fitting fixation portion is determined by an outer diameter of the shaft. Therefore, the adjustment of the press-fitting load at the time of assembling the magnet holder to the shaft is also difficult.

A magnet holder of the present disclosure is used in a rotational angle sensing device and is shaped in a tubular form while the magnet holder is configured to hold a magnet opposed to a magnetic sensor and is also configured to be securely press-fitted to a rotatable body. The magnet holder includes: a magnet holding portion that is located at one side of the magnet holder in an axial direction; a press-fitting fixation portion that is located at another side of the magnet holder in the axial direction; and a connecting portion that connects between the magnet holding portion and the press-fitting fixation portion.

Furthermore, an outer diameter of the press-fitting fixation portion is different from an outer diameter of the magnet holding portion, and a wall thickness of the press-fitting fixation portion is different from a wall thickness of the magnet holding portion. With such a dimensional relationship, the outer diameter of the rotatable body can be designed regardless of the size of the magnet. Further, since the wall thickness of the press-fitting fixation portion can be designed regardless of the size of the magnet and the size of the rotatable body, adjustment of the press-fitting load is easy. For example, it is possible to adjust the press-fitting load to an optimum press-fitting load in view of limiting buckling of the magnet holder at the time of press-fitting the magnet holder to the rotatable body.

Hereinafter, a plurality of embodiments of a magnet holder will be described with reference to the drawings. The same reference signs are given to substantially the same configurations among the embodiments, and redundant description thereof will be omitted. The magnet holder is used in a rotational angle sensing device. The rotational angle sensing device is installed in, for example, a rotary electric machine of an electric power steering device of a vehicle to sense a rotational position of a rotor.

Figure 1:
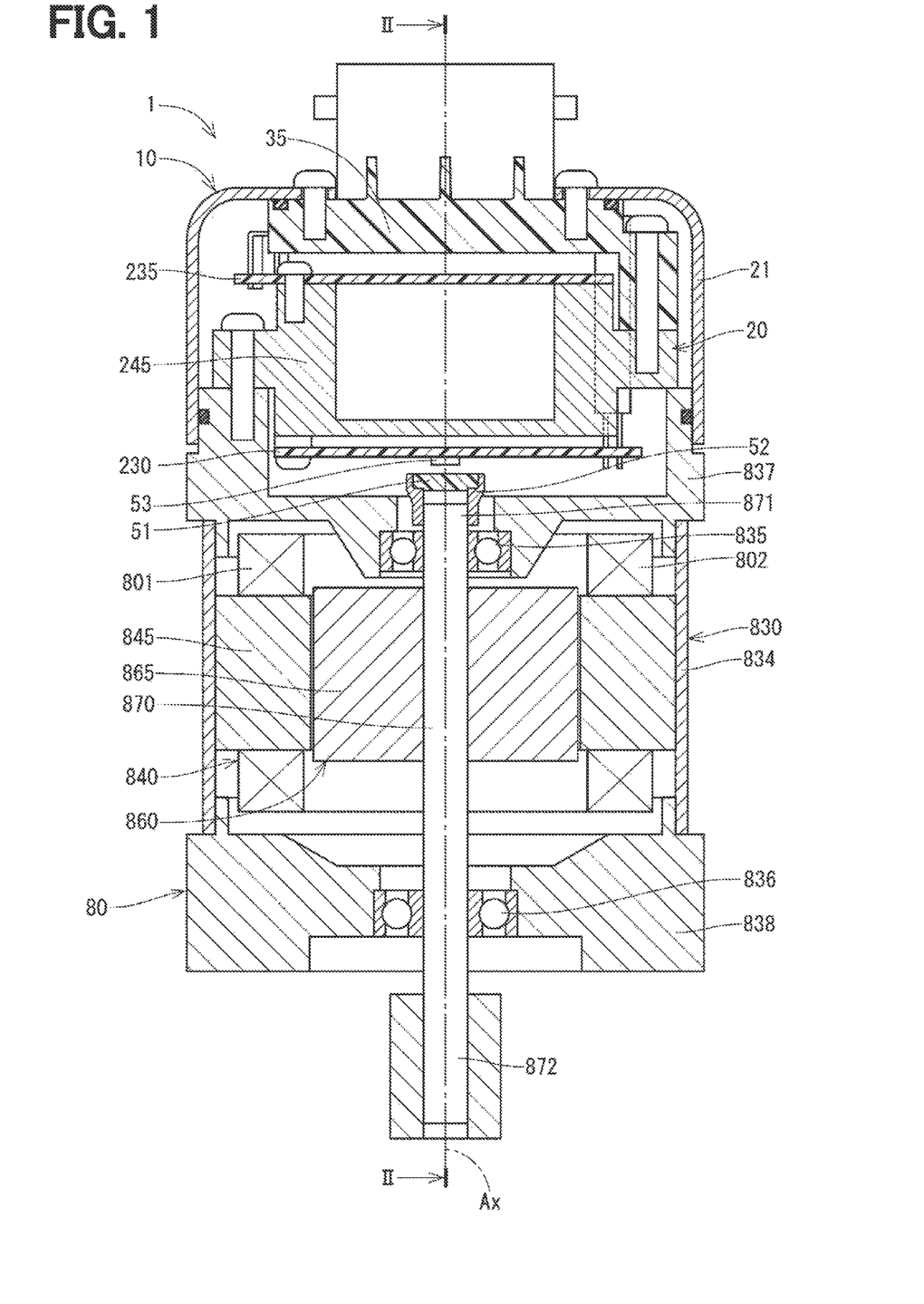
FIG. 1 is a longitudinal cross-sectional view of a rotary electric machine.
Figure 2:
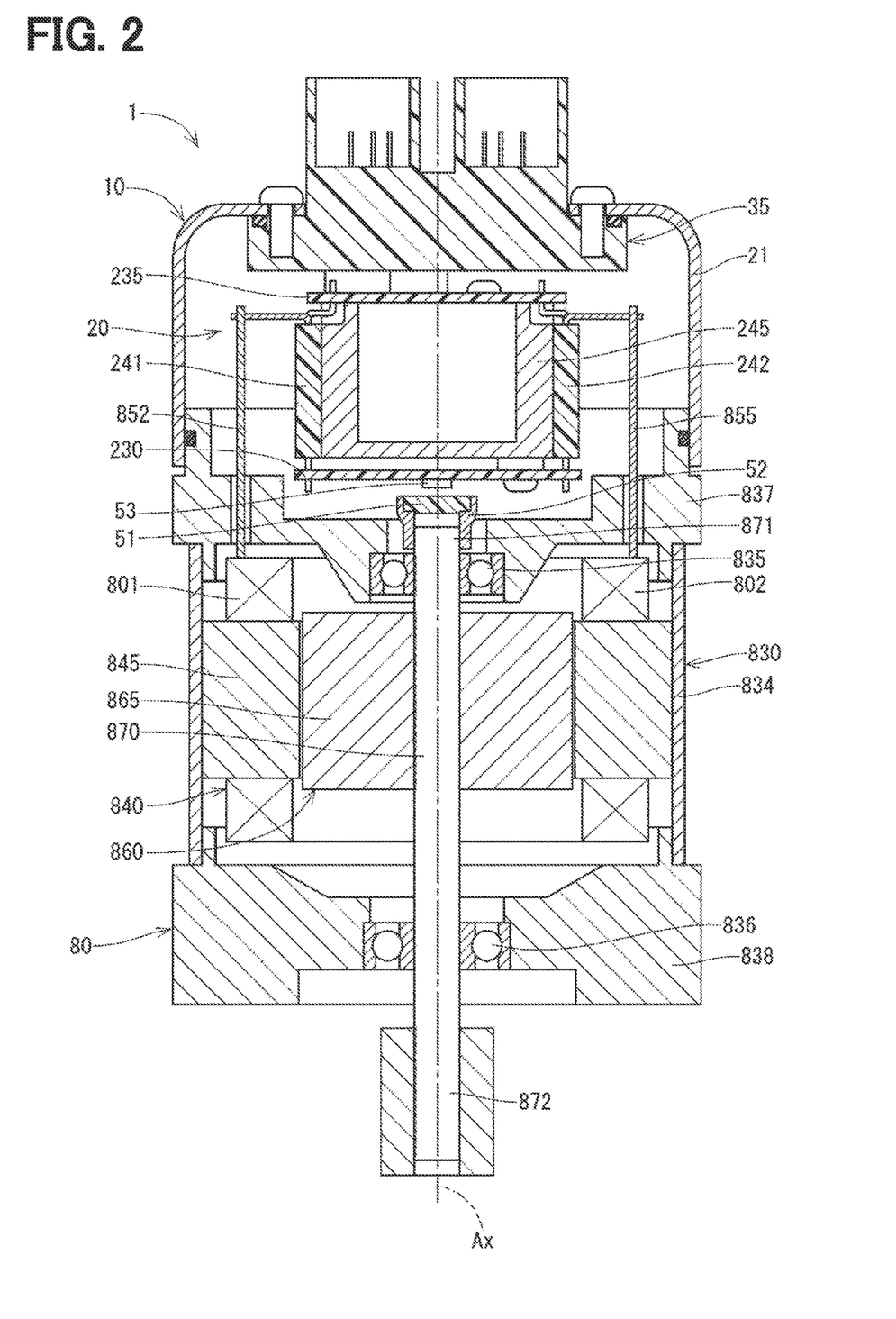
FIG. 2 is a cross-sectional view of the rotary electric machine taken along line II-II in FIG. 1.

First, the rotary electric machine will be described as an arrangement common to each of the following embodiments. As shown in FIGS. 1 and 2, the rotary electric machine 1 includes an electric motor arrangement 80 and a control arrangement 10.

The electric motor arrangement 80 is formed by, for example, a three-phase brushless motor and includes a case 830, a stator 840 and a rotor 860. The case 830 includes: a tubular portion 834; a rear frame end 837 provided at one end of the tubular portion 834; and a front frame end 838 provided at the other end of the tubular portion 834. The rear frame end 837 and the front frame end 838 are joined together by, for example, bolts (not shown). In the present embodiment, the tubular portion 834, the rear frame end 837 and the front frame end 838 are formed by separate members, respectively. However, in another embodiment, two or more of the tubular portion 834, the rear frame end 837 and the front frame end 838 may be formed by a common member.

The stator 840 includes: a stator core 845 which is fixed to the tubular portion 834 in the case 830; and winding sets 801, 802 which are assembled to the stator core 845. Lead wires 852, 855 of the winding sets 801, 802 extend to the outside of the case 830 through the rear frame end 837.

The rotor 860 includes: a shaft (serving as a rotatable body) 870 which is supported by a rear bearing 835 and a front bearing 836; and a rotor core 865 which is fitted to the shaft 870. One end portion 871 and the other end portion 872 of the shaft 870 project outward from the case 830. The rotor 860 is installed on an inner side of the stator 840 and is rotatable relative to the stator 840.

The control arrangement 10 is installed at an outside of the case 830 and is electrically connected to the lead wires 852, 855. The control arrangement 10 includes: a control unit 20; a cover 21 which covers the control unit 20; and a connector unit 35 which connects the control unit 20 to an outside (an external device).

The control unit 20 includes: a heat sink 245 which is fixed to the rear frame end 837; circuit boards 230, 235 and power modules 241, 242 which are fixed to the heat sink 245; and various electronic components (not shown) which are installed to the circuit boards 230, 235. The circuit board 230 is installed at a location where the circuit board 230 is opposed to the rear frame end 837.

The control arrangement 10 controls the operation of the electric motor arrangement 80 such that the electric motor arrangement 80 generates a desired assist torque based on information obtained from the outside (external device(s)) and information, such as a motor electric current, which is obtained at the inside of the control arrangement 10. The electric motor arrangement 80 and the control arrangement 10 form an integrated mechanical and electrical drive device.

First Embodiment

Figure 3:
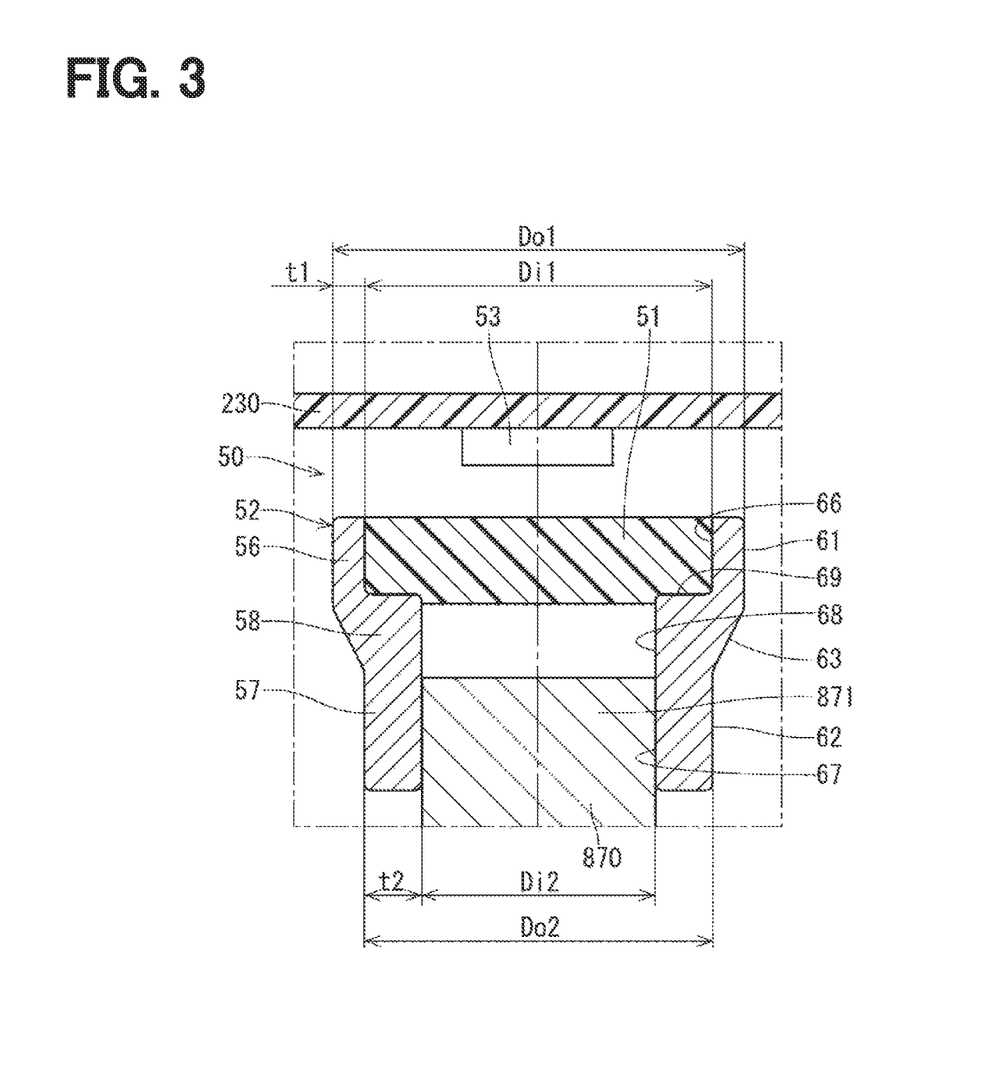
FIG. 3 is a cross-sectional view showing a magnet holder according to a first embodiment.

Next, the magnet holder of the first embodiment will be described. As shown in FIGS. 1 to 3, the rotary electric machine 1 has a rotational angle sensing device 50 that senses a rotational angle of the shaft 870 (i.e., a rotational position of the rotor 860). The rotational angle sensing device 50 includes a magnet 51, the magnet holder 52 and a magnetic sensor 53.

The magnet holder 52 is shaped in a tubular form. The magnet holder 52 holds the magnet 51 and is securely press-fitted to the one end portion 871 of the shaft 870. The magnetic sensor 53 is installed to the circuit board 230 at a location where the magnetic sensor 53 is opposed to the magnet 51, and the magnetic sensor 53 senses magnetism generated from the magnet 51. The magnet 51 is fixed to the shaft 870 by the magnet holder 52 and is rotated integrally with the shaft 870. When the magnet 51 is rotated together with the shaft 870, a relative positional relationship between the magnet 51 and the magnetic sensor 53 is changed. The magnetic sensor 53 senses an amount of the magnetic flux, which changes in response to the rotational angle of the shaft 870, and the magnetic sensor 53 outputs a signal, which corresponds to the rotational position of the rotor 860, to the control unit 20.

The magnet holder 52 is formed integrally in one-piece and includes: a magnet holding portion 56 that is located at one side (i.e., the circuit board 230 side) of the magnet holder 52 in an axial direction; a press-fitting fixation portion 57 that is located at another side (i.e., the shaft 870 side) of the magnet holder 52 in the axial direction; and a connecting portion 58 that connects between the magnet holding portion 56 and the press-fitting fixation portion 57.

The magnet holding portion 56, the press-fitting fixation portion 57 and the connecting portion 58 are respectively shaped in a tubular form. The magnet 51 is fixed at the inside of the magnet holding portion 56. The one end portion 871 is press-fitted to the inside of the press-fitting fixation portion 57. The connecting portion 58 is a portion between the magnet 51 and the one end portion 871.

An outer diameter Do2 of the press-fitting fixation portion 57 is different from an outer diameter Do1 of the magnet holding portion 56, and a wall thickness t2 of the press-fitting fixation portion 57 is different from a wall thickness t1 of the magnet holding portion 56. In the first embodiment, each portion of the magnet holder 52 is designed to satisfy the following conditions (A-1) to (C-1).

(A-1) An inner diameter Di1 of the magnet holding portion 56 is larger than an inner diameter Di2 of the press-fitting fixation portion 57.

(B-1) The outer diameter Do1 of the magnet holding portion 56 is larger than the outer diameter Do2 of the press-fitting fixation portion 57.

(C-1) A wall thickness t2 of the press-fitting fixation portion 57 is larger than a wall thickness t1 of the magnet holding portion 56.

An outer surface 61 and an inner surface 66 of the magnet holding portion 56 and an outer surface 62 and an inner surface 67 of the press-fitting fixation portion 57 extend generally parallel with the axial direction. Therefore, the wall thickness t1 and the wall thickness t2 do not change in the axial direction. In contrast, an outer surface 63 of the connecting portion 58 is a tapered surface. The outer surface 63 is formed such that the outer diameter of the connecting portion 58 is progressively reduced from the outer diameter Do1 to the outer diameter Do2.

An inner surface of the connecting portion 58 includes: an inner surface 68 that is generally parallel with the axial direction; and an annular planar surface (or simply referred to as a planar surface) 69 that is located at a boundary between the connecting portion 58 and the magnet holding portion 56. The annular planar surface 69 is a stepped surface located between the magnet holding portion 56 and the press-fitting fixation portion 57 and is perpendicular to the rotation axis Ax. In the cross-section, which extends along the rotation axis Ax, an angle of the outer surface 63 of the connecting portion 58 is different from an angle of each of the inner surfaces 68, 69 of the connecting portion 58. As a result, the wall thickness of the connecting portion 58 gradually changes from the magnet holding portion 56 toward the press-fitting fixation portion 57 while ensuring a sufficient area for receiving the magnet 51 by the annular planar surface 69 located on the magnet holding portion 56 side.

The magnet holder 52 is made of a non-magnetic material. As a result, it is possible to limit the disturbance of the magnetic path of the magnet 51. Furthermore, the magnet holder 52 is manufactured by sintering. In another embodiment, the magnet holder may be manufactured by another manufacturing method such as forging.

The information, which is obtained by the control unit 20 from the rotational angle sensing device 50, is used to command the supply of the electric current according to the rotational position of the rotor 860 in the motor control operation. The magnet holder 52 may be configured to have, for example, a groove (notch) or a planar surface (orientation flat) at a circumferential part of the magnet holder 52 to enable visual recognition of a magnetizing direction of the magnet 51 for the purpose of adjusting the magnetizing direction of the magnet 51 and the rotational position of the rotor 860. Furthermore, in order to eliminate or alleviate a limitation on the adjustment of the assembling direction of the magnet holder 52 to the shaft 870, which is required to adjust the magnetizing direction and the rotational position discussed above, the magnetizing direction of the magnet 51 may be sensed with the magnetic sensor 53, and the sensed magnetizing direction may be stored as a correction value for the magnetizing direction and the rotational direction in a processor of the control unit 20, so that the magnet holder 52 may be configured without having the groove or the planar surface. In the first embodiment, the magnet holder 52 is configured without having the groove or the planar surface.

Advantages

As described above, in the first embodiment, the outer diameter Do1 of the press-fitting fixation portion 57 is different from the outer diameter Do2 of the magnet holding portion 56, and the wall thickness t1 of the press-fitting fixation portion 57 is different from the wall thickness t2 of the magnet holding portion 56. With such a dimensional relationship, the outer diameter of the shaft 870 can be designed regardless of the size of the magnet 51. Further, since the wall thickness t1 of the press-fitting fixation portion 57 can be designed regardless of the size of the magnet 51 and the size of the shaft 870, the adjustment of the press-fitting load is easy. For example, it is possible to adjust the press-fitting load to an optimum press-fitting load in view of limiting buckling of the magnet holder 52 at the time of press-fitting the magnet holder 52 to the shaft 870.

Furthermore, in the first embodiment, the wall thickness t2 of the press-fitting fixation portion 57 is larger than the wall thickness t1 of the magnet holding portion 56. By changing the wall thickness in this way, it is possible to adjust the press-fitting load to the optimum press-fitting load in view of limiting the buckling of the magnet holder 52 at the time of press-fitting the magnet holder 52 to the shaft 870. As a result, the strength of the portion of the magnet holder 52, at which the stress is concentrated during the press-fitting, is improved.

Furthermore, in the first embodiment, the outer surface 63 of the connecting portion 58 is the tapered surface. As a result, the strength of the connecting portion 58 can be improved.

Furthermore, in the first embodiment, the inner diameter Di1 of the magnet holding portion 56 is larger than the inner diameter Di2 of the press-fitting fixation portion 57. In the cross-section, which extends along the rotation axis Ax, the angle of the outer surface 63 of the connecting portion 58 is different from the angle of each of the inner surfaces 68, 69 of the connecting portion 58. The inner surface of the connecting portion 58 includes the annular planar surface 69. The annular planar surface 69 is the stepped surface located between the magnet holding portion 56 and the press-fitting fixation portion 57 and is perpendicular to the rotation axis Ax. As a result, the shape of the magnet 51 can be made into a cylindrical form that is suitable for the magnetic circuit. Furthermore, the connecting portion 58 can be formed such that the wall thickness of the connecting portion 58 gradually changes from the magnet holding portion 56 toward the press-fitting fixation portion 57 while ensuring the sufficient area for receiving the magnet 51 by the annular planar surface 69 located on the magnet holding portion 56 side.

Furthermore, in the first embodiment, the outer diameter Do1 of the magnet holding portion 56 is larger than the outer diameter Do2 of the press-fitting fixation portion 57. As a result, it is possible to provide the magnet 51 having the size that allows a good magnetic circuit to be obtained while making the wall thickness t2 larger than the wall thickness t1.

Second Embodiment

Figure 4:
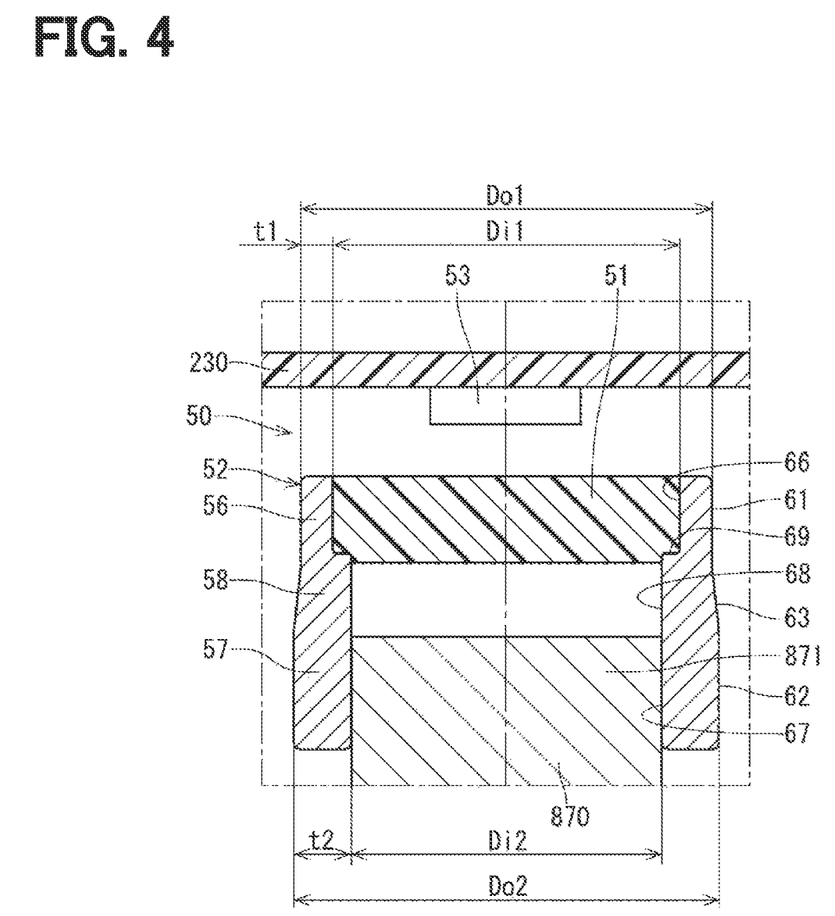
FIG. 4 is a cross-sectional view showing a magnet holder according to a second embodiment.

In the second embodiment, as shown in FIG. 4, each portion of the magnet holder 52 is designed to satisfy the following conditions (A-2) to (C-2). Nevertheless, like in the first embodiment, the outer diameter of the shaft 870 can be designed regardless of the size of the magnet 51, and the adjustment of the press-fitting load is easy.

Di1>Di2  (A-2)

Do1<Do2  (B-2)

t2>t1  (C-2)

Third Embodiment

Figure 5:
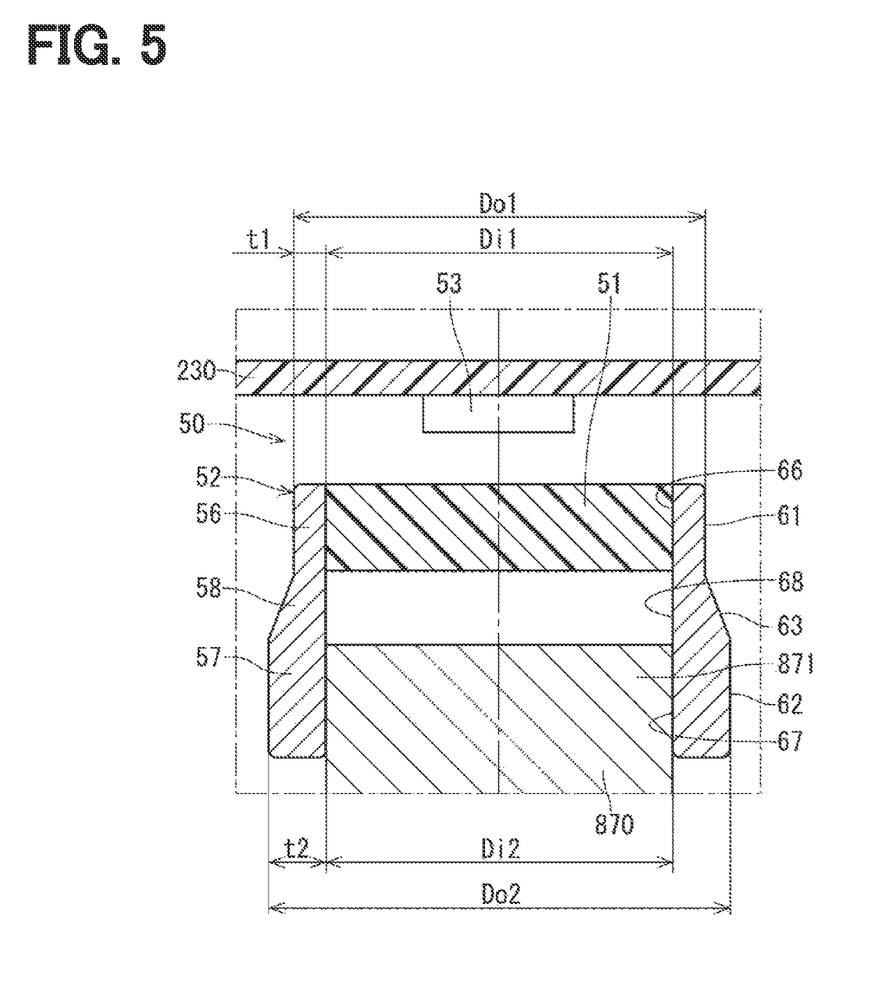
FIG. 5 is a cross-sectional view showing a magnet holder according to a third embodiment.

In the third embodiment, as shown in FIG. 5, each portion of the magnet holder 52 is designed to satisfy the following conditions (B-3) to (C-3). Nevertheless, like in the first embodiment, the adjustment of the press-fitting load is easy.

Do1<Do2  (B-3)

t2>t1  (C-3)

Fourth Embodiment

Figure 6:
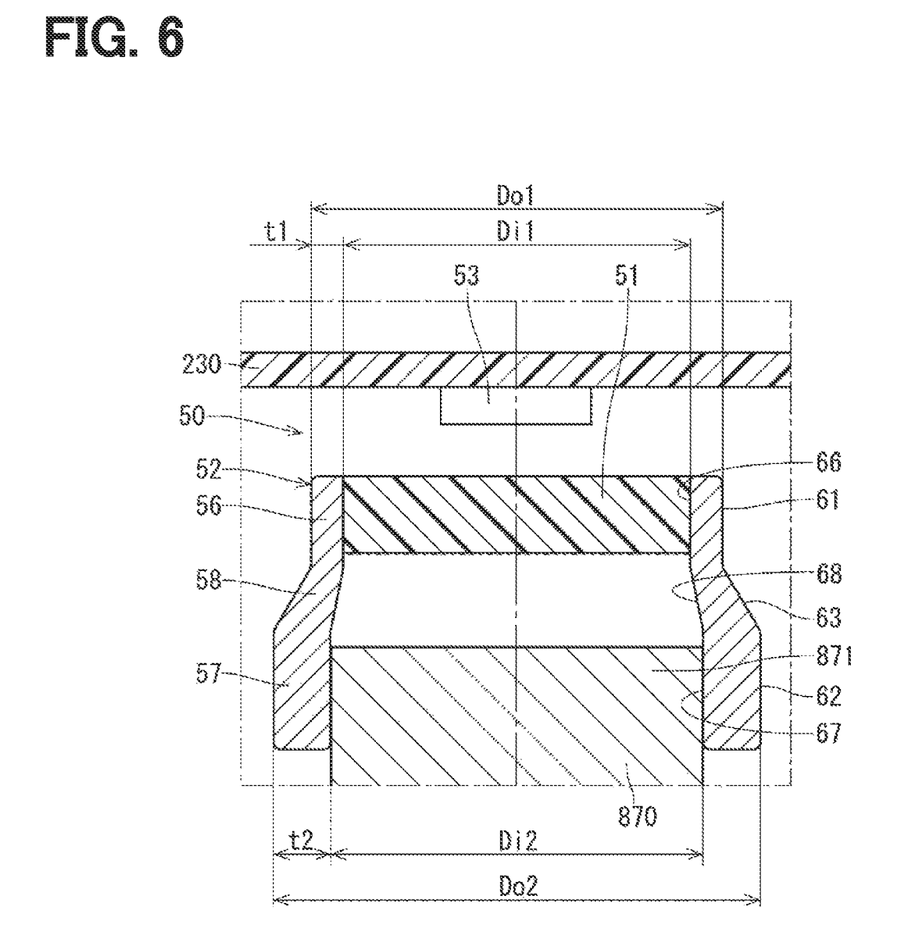
FIG. 6 is a cross-sectional view showing a magnet holder according to a fourth embodiment.

In the fourth embodiment, as shown in FIG. 6, each portion of the magnet holder 52 is designed to satisfy the following conditions (A-4) to (C-4). Nevertheless, like in the first embodiment, the outer diameter of the shaft 870 can be designed regardless of the size of the magnet 51, and the adjustment of the press-fitting load is easy.

Di1<Di2  (A-4)

Do1<Do2  (B-4)

t2>t1  (C-4)

Fifth Embodiment

Figure 7:
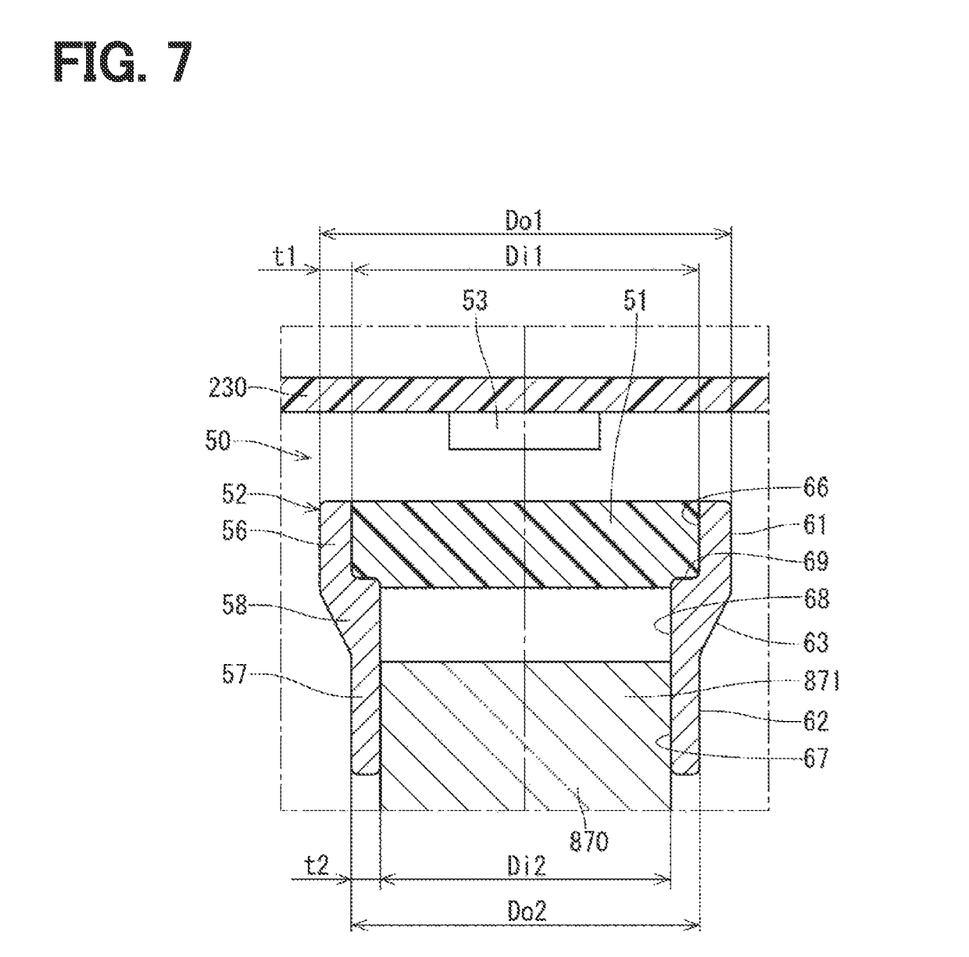
FIG. 7 is a cross-sectional view showing a magnet holder according to a fifth embodiment.

In the fifth embodiment, as shown in FIG. 7, each portion of the magnet holder 52 is designed to satisfy the following conditions (A-5) to (C-5). Nevertheless, like in the first embodiment, the outer diameter of the shaft 870 can be designed regardless of the size of the magnet 51, and the adjustment of the press-fitting load is easy.

$$Di1>Di2 \quad (A\text{-}5)$$

$$Do1>Do2 \quad (B\text{-}5)$$

$$t2<t1 \quad (C\text{-}5)$$

Other Embodiments

In another embodiment, the application of the rotational angle sensing device is not limited to the rotary electric machine, and the rotational angle sensing device may be used for sensing a rotational angle of a rotatable body in another type of device. In another embodiment, the application of the rotary electric machine is not limited to the electric power steering apparatus, and the rotary electric machine may be used in another type of device.

The present disclosure is not limited to the above-described embodiments and may be implemented in various forms without departing from the scope of the present disclosure.

The present disclosure has been described in accordance with the embodiments. However, the present disclosure is not limited to such embodiments and structures. The present disclosure also includes various variations and variations within the equivalent range. Also, various combinations and forms, as well as other combinations and forms that include only one element, more, or less, are within the scope and ideology of the present disclosure.

What is claimed is:

1. A magnet holder that is used in a rotational angle sensing device and is shaped in a tubular form while the magnet holder is configured to hold a magnet opposed to a magnetic sensor and is also configured to be securely press-fitted to a rotatable body, the magnet holder comprising:
    a magnet holding portion that is located at one side of the magnet holder in an axial direction;
    a press-fitting fixation portion that is located at another side of the magnet holder in the axial direction; and
    a connecting portion that connects between the magnet holding portion and the press-fitting fixation portion, wherein:
    an outer diameter of the press-fitting fixation portion is different from an outer diameter of the magnet holding portion, and a wall thickness of the press-fitting fixation portion is different from a wall thickness of the magnet holding portion; and
    each of an outer surface and an inner surface of the connecting portion is a tapered surface that is formed to extend circumferentially all around a rotation axis of the rotatable body.

2. The magnet holder according to claim 1, wherein the wall thickness of the press-fitting fixation portion is larger than the wall thickness of the magnet holding portion.

3. The magnet holder according to claim 1, wherein:
    an inner diameter of the magnet holding portion is larger than an inner diameter of the press-fitting fixation portion;
    in a cross-section, which extends along the rotation axis of the rotatable body, an angle of the outer surface of the connecting portion is different from an angle of an inner surface of the connecting portion; and
    the inner surface of the connecting portion includes a planar surface that is a stepped surface located between the magnet holding portion and the press-fitting fixation portion and is perpendicular to the rotation axis.

4. The magnet holder according to claim 1, wherein the outer diameter of the magnet holding portion is larger than the outer diameter of the press-fitting fixation portion.

5. The magnet holder according to claim 1, wherein the press-fitting fixation portion is press-fitted to the rotatable body.

6. The magnet holder according to claim 1, wherein the inner surface of the connecting portion is positioned between an end of the magnet and an end of the rotatable body with respect to the rotation axis.

7. The magnet holder according to claim 6, wherein the outer surface of the connecting portion is positioned between the end of the magnet and the end of the rotatable body with respect to the rotation axis.

8. The magnet holder according to claim 1, wherein the inner surface of the connecting portion comprises:
    a first inner diameter positioned on a first axial end of the connecting portion; and
    a second inner diameter positioned on a second axial end of the connecting portion,
    the first inner diameter is substantially similar to an inner diameter of the magnet holding portion, and
    the second inner diameter is substantially similar to an inner diameter of the press-fitting fixation portion.

9. The magnet holder according to claim 1, wherein the magnet holding portion, which is configured to directly contact and hold the magnet, has a cylindrical inner surface that has a constant inner diameter and axially extends along an entire axial extent of the magnet holding portion, and the cylindrical inner surface of the magnet holding portion is directly joined to the tapered surface, which is a conical surface and is formed as the inner surface of the connecting portion.

\* \* \* \* \*